United States Patent [19]
Pinfari et al.

[11] 3,710,725
[45] Jan. 16, 1973

[54] APPARATUS FOR PERFORMING EMBARKING AND DISEMBARKING OPERATIONS IN AMUSEMENT PARK ATTRACTIONS

[75] Inventors: Italo Pinfari; Pino Begotti, both of Suzzara, Italy

[73] Assignee: F.LLI Pinfari S.r.l., Suzzara Mantova, Italy

[22] Filed: Jan. 18, 1971

[21] Appl. No.: 107,155

[30] Foreign Application Priority Data

July 15, 1970 Italy..............................27448/70
Dec. 1, 1970 Germany..............P 20 59 104.2

[52] U.S. Cl.......................................104/35, 104/48
[51] Int. Cl............................................B60s 13/02
[58] Field of Search................104/35, 44, 45, 48, 99

[56] References Cited

UNITED STATES PATENTS

| 120,161 | 10/1871 | Muir | 104/35 |
| 1,857,852 | 5/1932 | McGoldrick | 104/35 |
| 3,362,349 | 1/1968 | Kirkland | 104/44 |

Primary Examiner—Drayton E. Hoffman
Assistant Examiner—D. W. Keen
Attorney—Toren & McGeady

[57] ABSTRACT

Apparatus for performing passenger embarking and disembarking operations in fair or amusement park attractions wherein vehicles are driven to cover a predetermined path as defined by track means or the like, means for comprising carrying-out said passenger embarking and disembarking operations on a vehicle lying on a track section which is positioned outside said path, while at least another vehicle is covering the path. At the end of said operations said track section is connected to the path and at least another track section, carrying another vehicle, is brought in said passenger embarking and disembarking position.

2 Claims, 2 Drawing Figures

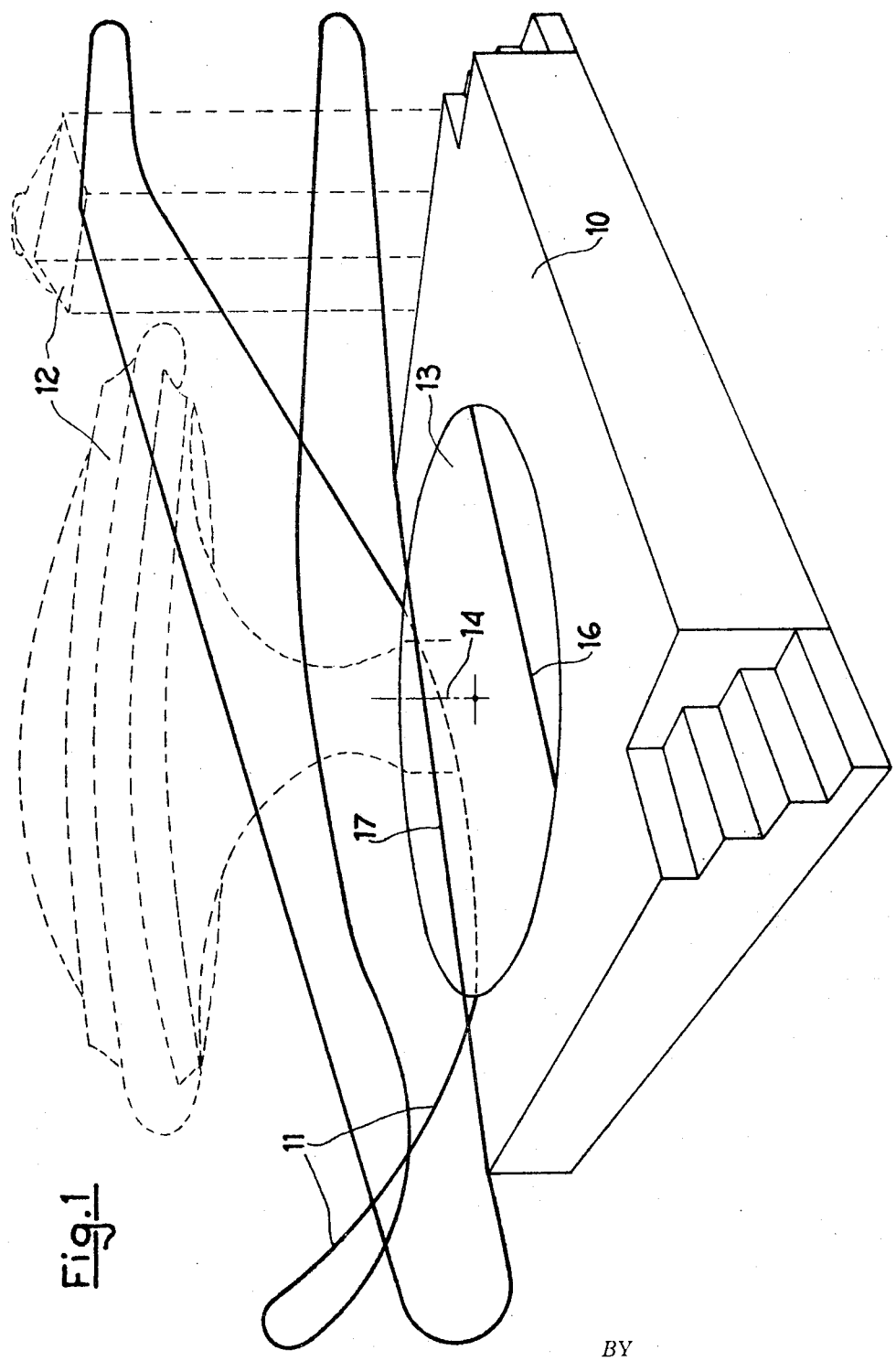

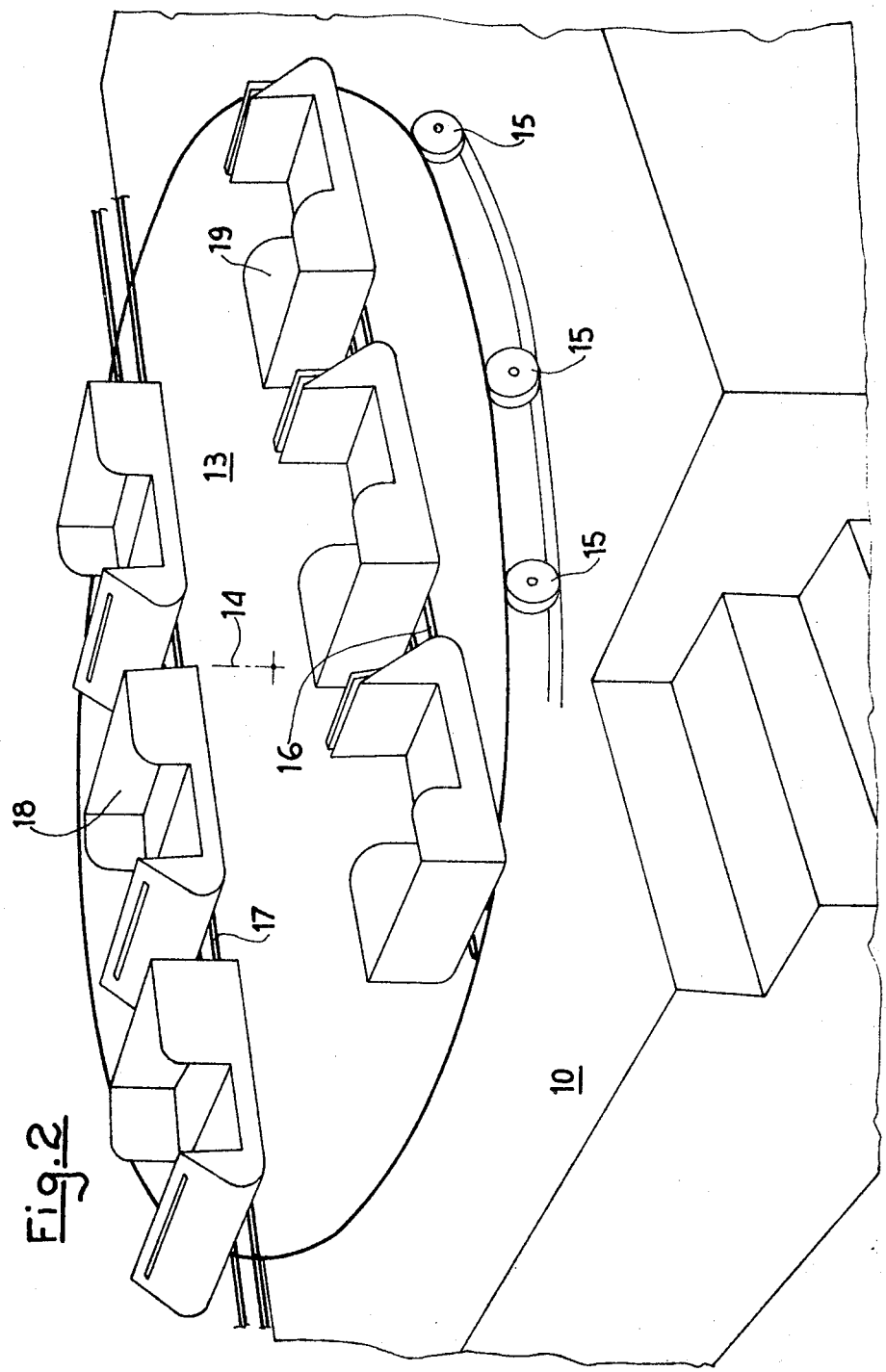

APPARATUS FOR PERFORMING EMBARKING AND DISEMBARKING OPERATIONS IN AMUSEMENT PARK ATTRACTIONS

BACKGROUND

This invention concerns construction and operational techniques of fair attractions of the type wherein a path, as defined by guide means, e.g., rail or track means, is covered by single conveyor means, e.g., trucks and the like, or by sets or trains of said truck means, that are caused to run along said guide means in a closed path comprising a station wherein said conveyor means are stopped to allow passenger disembarking and embarking operations.

More particularly, this invention relates to a device designed to accomplish passenger disembarking and embarking operations and in general an operating cycle of a fair attraction of the above defined or similar type in a shorter time and with means cheaper and simpler to operate than heretofore known.

The fair attractions of the above defined type, as well as all other similar attractions are designed to operate in a highly discontinuous manner, with rush hours wherein long queues of people are waiting for entering the attraction with consequent annoyance and reduced exploitation of the attraction. It is therefore obvious that in order to exploit such rush hours and obtain an economic advantage therefrom, it should be necessary to avoid any idle times in the attraction operating cycle, said idle times being due to the fact that said conveyor means are to be periodically stopped to allow said passenger embarking and disembarking operations. Therefore, such idle times, which are prejudicial to plant yield, ought to be avoided by devices that could be cheaply produced and easily operated.

SUMMARY

An object of this invention is to provide apparatus for performing the steps as required for carrying-out the operating cycle of a fair attraction of the above defined or similar type, wherein said idle times are substantially reduced and the plant yield is consequently improved.

A further object of this invention is to provide apparatus wherein said idle times for passengers embarking and disembarking operations are substantially reduced and wherein said conveyor means are allowed to cover twice or more times at will their route, without stopping at the passenger station.

Another object of this invention is to provide a novel and improved device which can be cheaply produced and easily and reliably operated when associated with an entertainment plant of the above defined type.

Accordingly, the apparatus of this invention, in a fair entertainment plant of the abovestated or similar type, is essentially characterized in that two or more conveyor means, or trains of conveyor means are utilized on a running path as defined by guide means, and in that the time taken by one or more conveyor means or by one or more trains of said conveyor means to cover said path is at least partially employed for performing passenger embarking and disembarking operations of and into at least another conveyor means or train of conveyor means lying on at least a section of said guide means located outwardly of said path, said guide means sections being shiftable in a position wherein said conveyor means or train may be forwarded to said path. Thus, at least one conveyor means or train is running on said path during at least the most part of the time taken by said passenger embarking and disembarking operations on another conveyor means or train, thereby obtaining a required high plant yield.

According to a simplified embodiment of the invention, which however offers the best possibilities of practical use, in plants having usual sizes and capacities, only two conveyor means or trains are provided and consequently two guide means sections can be alternately switched off from and switched on to said path, said switched off guide means section carrying one conveyor means or train to allow passenger embarking and disembarking operations, while the other conveyor means or train is running on said path. Said guide means section which is switched on to said path provides a closure of the same path in order to allow the same to be covered twice or more times by the same conveyor means or train, when required.

In the operation of the invention, a novel and improved device is provided in order to switch off and on to said path said guide means sections, said device comprising at least one supporting means for two or more guide means sections, said supporting means being successively shiftable in a plurality of positions wherein each guide means section lies outwardly of said path or in a connecting condition with reference to said path, in order to forward to and/or receive from the same a conveyor means or a train of said conveyor means.

According to said simplified embodiment of this invention, said device is preferably in the form of a turntable that can be turned about an axis advantageously coincident with its geometric axis and whereon two guide means sections are fitted on diametrically opposite sides, in such a manner as to form chords of said turntable. Each guide means section may be alternately connected in closing relationship with the path whereon a conveyor means or train is running, while the other conveyor means or train is lying on the other guide means section that is switched out of said path to allow passenger embarking and disembarking operations.

DRAWINGS

FIG. 1 is a diagrammatic perspective view of a fair entertainment plant embodying to this invention.

FIG. 2 is a diagrammatic enlarged perspective view of a device according to this invention.

PREFERRED EMBODIMENT

Referring now to the drawings, an entertainment attraction plant as shown essentially consists of a platform 10 defining a passenger embarking and disembarking station, said platform being therefore accessible to the people. A path 11, closed on said station 10, is defined by guide means, e.g., by rail or track means (not particularly shown) which are supported by structures and attachments 12 in a known manner.

According to a preferred embodiment of this invention, said platform 10 acting as a passenger embarking and disembarking station carries a turntable 13, e.g., a circularly shaped turntable that can be turned about its own geometric axis 14, said turntable being supported by wheels 15.

Said turntable carries guide means sections (two track sections in the shown embodiment) of the type forming said path 11, such sections, e.g., the track sections 16 and 17 being located diametrically opposite on either sides of said axis 14 in such a manner that each defines an equal chord of the circumference as defined by the edge of said turntable 13. By suitably turning said turntable 13 in this case each time by 180°, each track section can be alternately switched off from said path 11 in order to make accessible to people truck or trucks lying thereon for passenger embarking and disembarking operations, like section 16 as shown in the drawing. Each track section can be alternately switched in a connecting relationship with said path for introducing into and/or receiving from the same a conveyor means or a train of such means. As shown in the drawing, the track section alternately switched in a connecting relationship with said path 11, as section 17, is properly connected therewith in order to complete and close the same, said section being thus able to introduce and receive one or more trucks.

The operation of the invention is very simple and easy. Assuming that a truck or a truck train 18 and 19 respectively is lying on each track section 16 and 17, with passengers which shall travel and respectively which have already traveled through the entertainment attraction path, by turning said turntable 13 for 180° the truck train 19 is switched in connecting relationship with said path and routed immediately thereon, while the truck train 18 is brought in the position as previously taken by trucks 19, i.e., outwardly to said path 11 and in a direction opposite to truck running thereon, to allow for passenger disembarking and further passenger embarking operations which are carried out during the time taken by said trucks 19 to cover said path 11. When said truck train 19 at the end of its travel comes again back on the track section 16 of turntable 13 and is stopped thereon by suitable means (not shown), said turntable 13 is then rotated by 180° and said truck trains are brought back in their previously taken positions. Another operating cycle may be then started again, wherein the truck train 18 is routed on said path.

As can be readily appreciated, what previously set forth for the above considered plant can be applied to more complex plants wherein three or more conveyor means or trains are utilized, according to the plant capacity, the path length and foreseen running times. Likewise and particularly when more than two conveyor means or trains are utilized, a turntable or support means 13 having more than two track sections may be provided, each track section on said turntable or support means 13 being again alternately movable in a position outside the path 11 and respectively in a position wherein trucks may be routed to the path 11 and/or received from the same. Said truck routing and receiving positions might differ from each other and thus a further rotation of turntable 13 is required to pass from the one to the other position. Said arrangement allows for a very high number of practical solutions in carrying-out operations according to this invention. When a coincidence condition of said truck routing and receiving positions is satisfied for at least one track section or the like on said turntable 13, i.e., when said path 11 is closed by said section, the path 11 can be traversed more than once, when required, by one or more trucks or by one or more truck trains, by simply disengaging the braking means with which said track section is fitted.

Obviously the device by which the track sections or the like are moved according to this invention may be different than that shown and described. Thus, e.g., it may comprise a platform shape other than a circular one and/or a platform turning about an axis other than its geometric axis, or that can be translated.

Obviously, many changes and modifications are possible in the light of above teachings. Therefore it is to be understood that the invention is not limited to the details specifically described or shown and that within the scope of the appended claims it may be practised otherwise.

We claim:

1. In an amusement apparatus for conveying passengers including a supporting structure having mounted thereon rail means defining a closed circuit path, conveyor means engaging said rail means for carrying passengers along said closed circuit path, and station means located along a section of said closed circuit path for enabling embarking and disembarking of passengers from said conveyor means, the improvement wherein said station means comprise a turntable having mounted thereon a plurality of sections of said rail means, said sections being adaptable for engagement and disengagement only with said rail means defining said closed circuit path, means for rotating said turntable to a plurality of positions in which all but one of said plurality of rail sections mounted on said turntable are disengaged from said closed circuit path, with one of said sections being always maintained in engagement with said closed circuit path thereby to maintain said path continuously intact during operation of said amusement apparatus, said conveyor means including a plurality of separate vehicles, and means for selectively stopping said vehicles upon a section of said rail means mounted on said turntable which is engaged in said closed circuit path, whereby rotation of said turntable will enable vehicles of said conveyor means to be taken out of said closed circuit path for embarking and disembarking of passengers therefrom at said station means while maintaining said closed circuit path intact thereby avoiding interference with movement of other vehicles thereon, said closed path providing the only inlet and outlet of vehicles moving on the rail means to and from the turntable rail sections.

2. Apparatus according to claim 1, wherein each of said rail sections mounted on said turntable includes breaking means for selectively stopping said vehicles thereon during their travel along said closed circuit path.

* * * * *